United States Patent [19]

Debell

[11] Patent Number: 4,636,880
[45] Date of Patent: Jan. 13, 1987

[54] PROGRAMMABLE ANNUNCIATOR

[75] Inventor: Lawrence R. Debell, Bethany, Okla.

[73] Assignee: Phi Technologies, Inc., Oklahoma City, Okla.

[21] Appl. No.: 626,117

[22] Filed: Jun. 29, 1984

[51] Int. Cl.[4] ............................................. G11B 15/18
[52] U.S. Cl. .................................. 360/72.3; 360/72.2; 360/74.4
[58] Field of Search .................... 360/72.1, 72.2, 72.3, 360/74.4

[56] References Cited

U.S. PATENT DOCUMENTS

| | | | |
|---|---|---|---|
| 4,210,785 | 7/1980 | Huber et al. | 360/72.2 |
| 4,210,940 | 7/1980 | Prysby et al. | 360/72.3 |
| 4,301,482 | 11/1981 | Trevithick | 360/72.2 |
| 4,302,784 | 11/1981 | Mussatt | 360/72.1 |
| 4,338,644 | 7/1982 | Staar | 360/69 |
| 4,411,008 | 10/1983 | d'Alayerdecostemore d'Arc et al. | 360/72.3 |

Primary Examiner—George G. Stellar
Attorney, Agent, or Firm—Laney, Dougherty, Hessin & Beavers

[57] ABSTRACT

A programmable annunciator device for periodic fade-in of specific message segments in a continuous broadcast or background audio. The device utilizes a tape cassette and transport with reel turns count circuitry providing tape position data. The cassette is programmed to include two tracks of successive messages of preselected time length, each identifiable by reel turns count. The reel turns count for each message position is stored in read only memory while random access memory is programmed to include code identifier and address data for each message position. In program mode, the desired audio is recorded at each message position for selective playback. In operate mode, an interval timer initiates playback of the selected messages in sequence and timing as selected by the operator.

31 Claims, 6 Drawing Figures

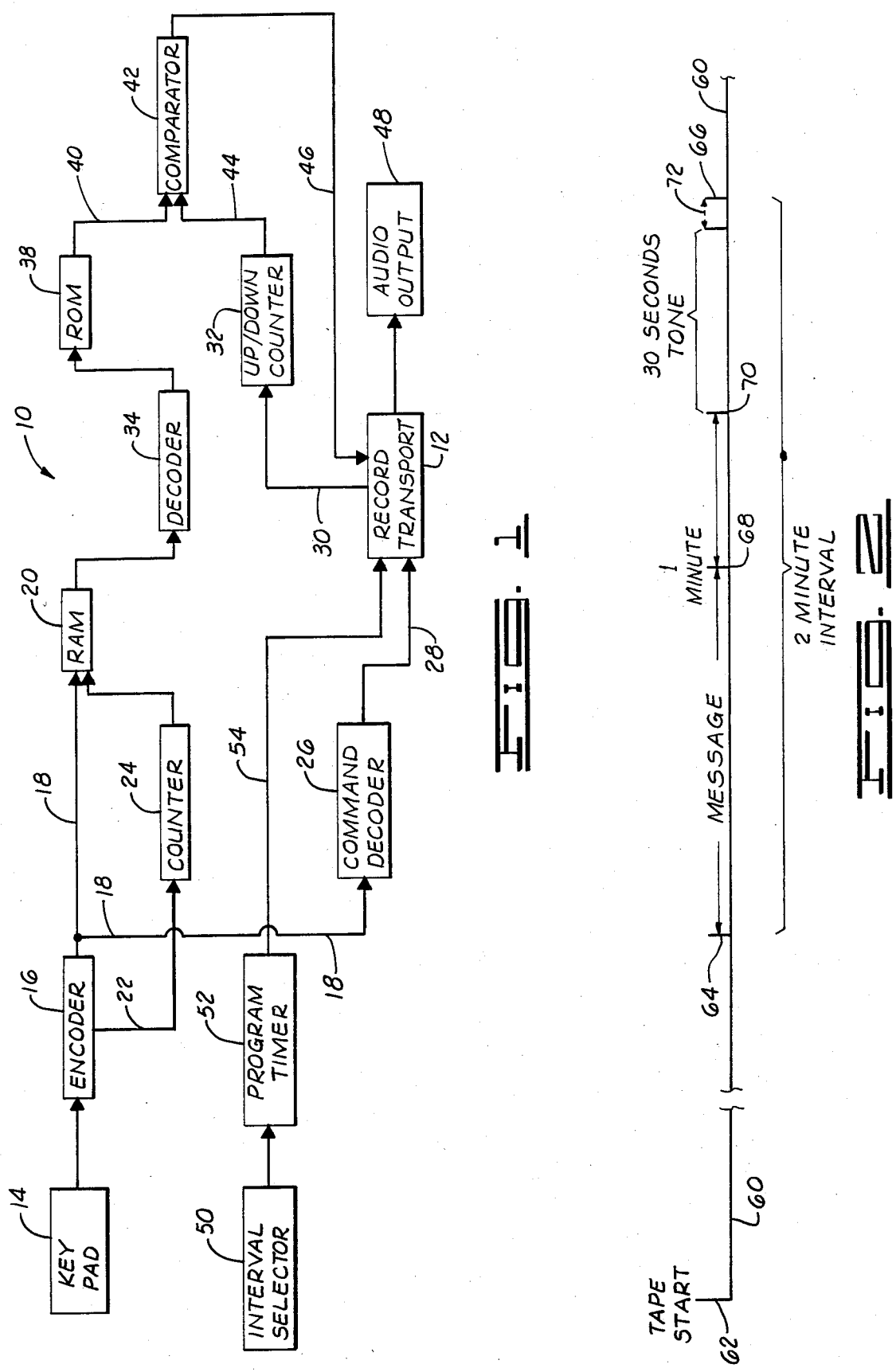

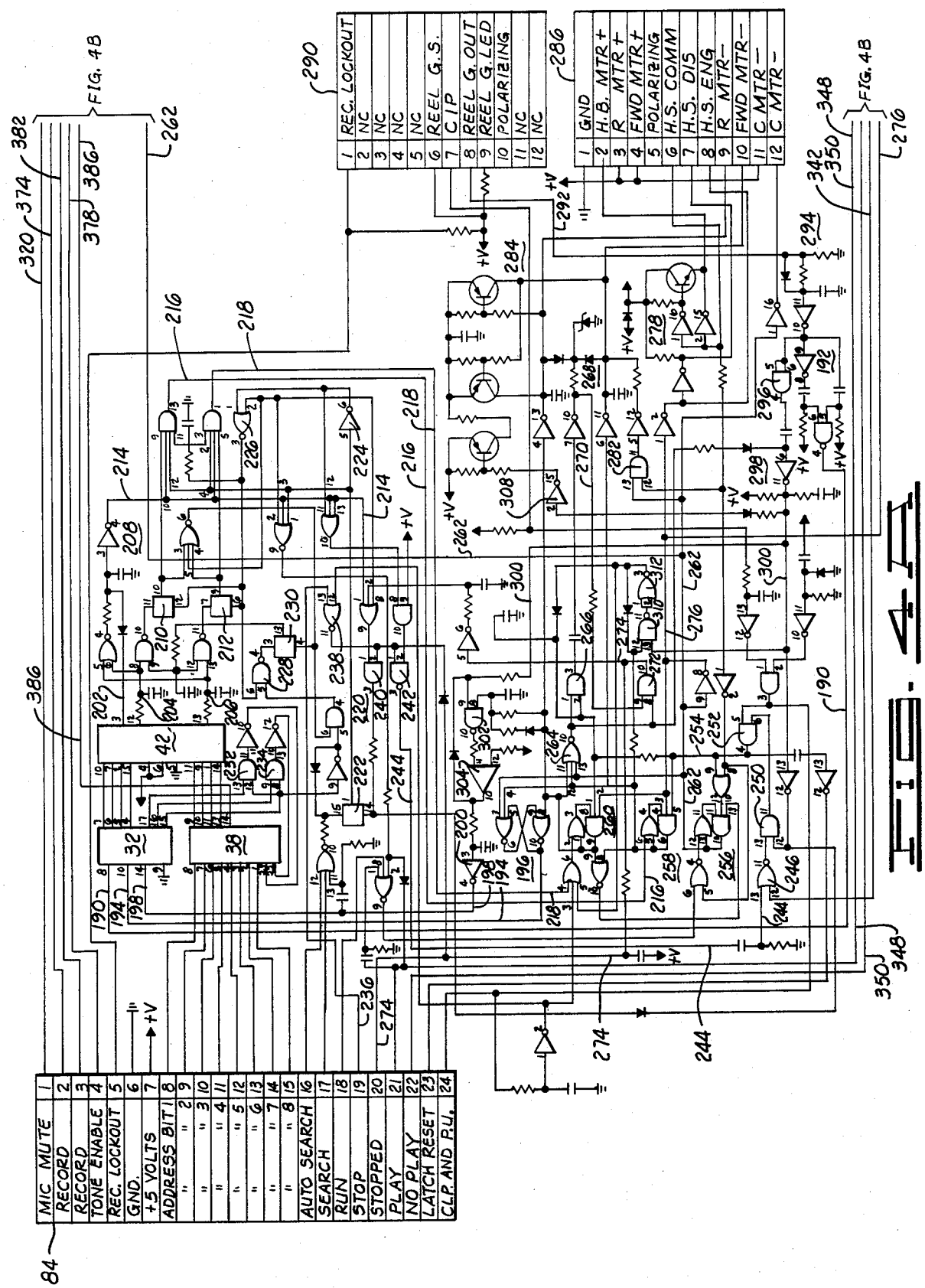

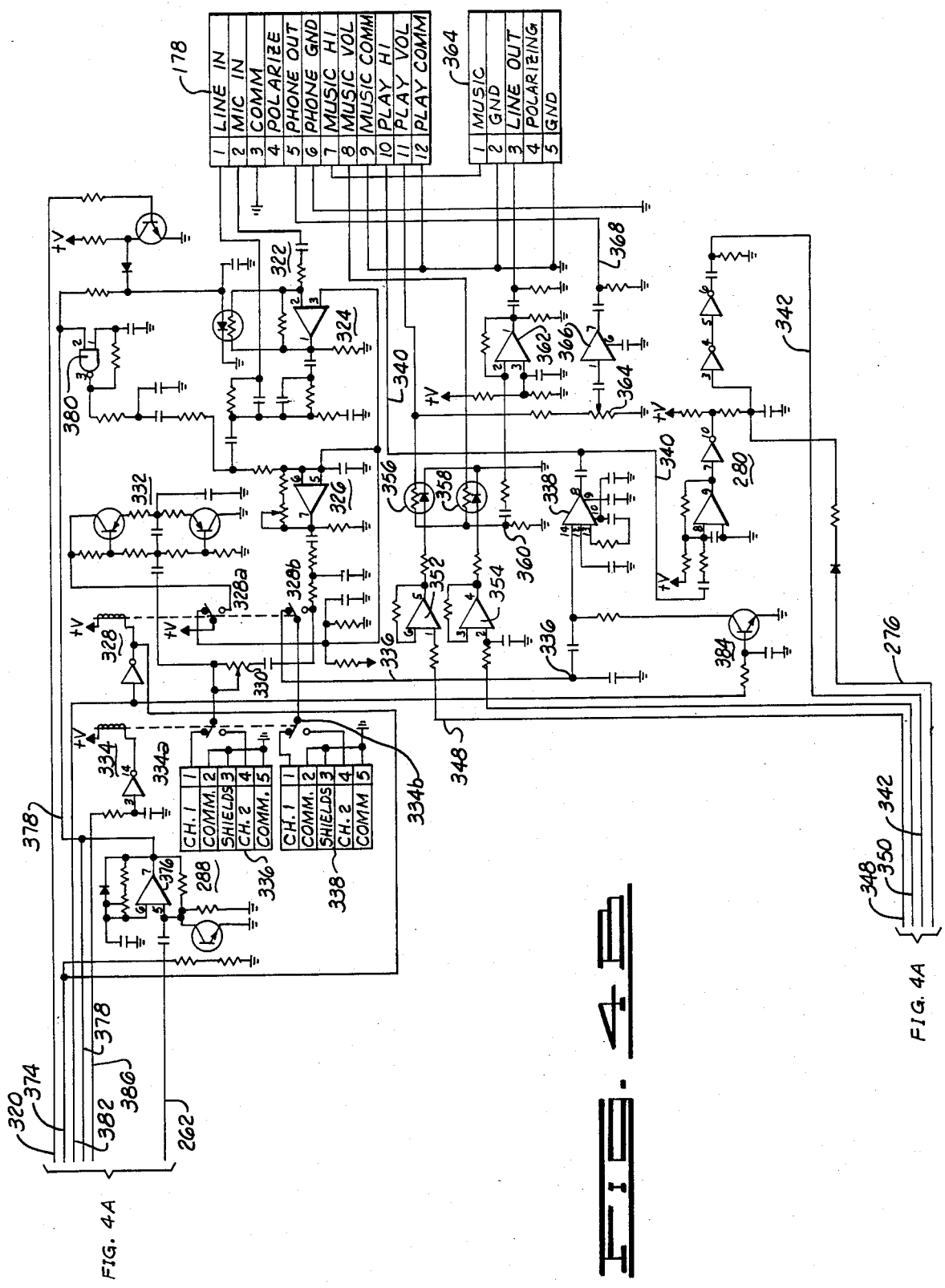

PROGRAMMABLE ANNUNCIATOR

BACKGROUND OF THE INVENTION

1. Field of the Invention

The invention relates generally to an annunciator apparatus and, more particularly, but not by way of limitation, it relates to a programmable commercial message repeater system which may be controlled to deliver messages in any sequence or at any specific times.

2. Description of the Prior Art

The prior art includes numerous types of annunciator systems which utilize pre-recorded messages for sequential enablement and auditory output over a speaker network. Such prior devices have utilized recorder/reproducer transport equipment and various forms of record media, and such systems have been preprogrammed in a sense that the pre-recorded messages were played back sequentially in accordance with a selected schedule, timing of which was a function of tape speed of playback. In still other forms, playback sequence may be controlled by various types of clock timer and relay network to deliver the message of proper sequence at proper time position. In general, most approaches to programmed message timing and sequence relied upon state of the art recording and playback techniques coupled with known and obvious timing and control measures.

SUMMARY OF THE INVENTION

The present invention relates to an apparatus for storing a number of commercial or informational messages on cassette with the capability of periodically accessing selected messages in a programmed sequence for insertion into a background music system such as the type that may be found in supermarkets, other retail stores, shopping malls, and the like. The present invention consists of encoding, timing, storage and control logic circuitry in combination with a recorder/-playback transport and audio output system for producing a series of messages of predetermined duration, each allotted message duration also carrying a predetermined toned indexing record for control of message selection and start time interval.

A numeric keypad is used to input tape position message data through a random access memory for development of address data which is input to a programmed read-only memory, such programming being related to cassette reel turns. A record transport under control of program timing provides output of reel turns data for count comparison with selected output from the read-only memory, such comparator output being input for control of the record transport in order to position the selected program intervals of recorded material.

Therefore, it is an object of the present invention to provide a programmed message communication system that provides greater accuracy, capacity and flexibility than any other comparable equipment of the similar type.

It is also an object of the present invention to provide a selective communication system that includes a larger number of selected long duration messages, and that is easy to program as to delivery sequence and time interval selection.

It is still further an object of the present invention to provide a programmed message system that utilizes the standard types of cassette record while offering simple operation, reliable performance and excellent audio output quality.

Finally, it is an object of the invention to provide a multi-message programmed audio system that utilizes conventional cassettes and that is easily programmed and re-programmed by the user albeit that he may be a relatively unskilled artisan.

Other objects and advantages of the invention will be evident from the following detailed description when read in conjunction with the accompanying drawings which illustrate the invention.

BRIEF DESCRIPTION OF THE DRAWINGS

FIG. 1 is a general block diagram of the circuitry of the present invention;

FIG. 2 is a function graph versus time of cassette tape tone and message content;

FIGS. 4A and 4B are a schematic diagram with designated interconnection, of control logic and tape transport control and audio output circuitry of the present invention.

DETAILED DESCRIPTION OF THE INVENTION

Figure 3A:
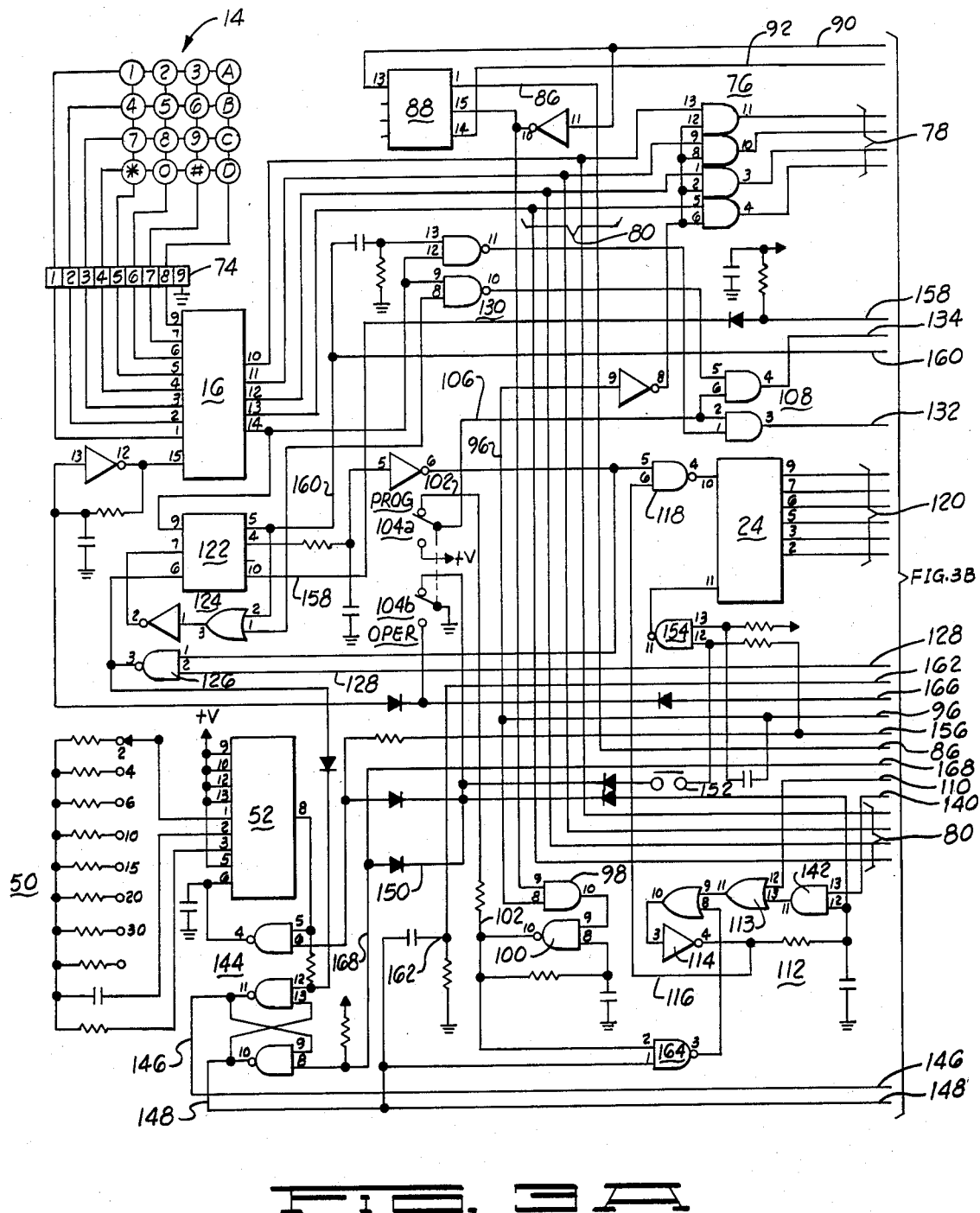
FIGS. 3A and 3B are an interconnected schematic diagram of coding, decoding, storage and control circuitry of the present invention.

Referring to FIG. 1, a main part of the programmed communication system 10 is a record transport 12, a recorder/reproducer transport that is capable of providing a reel turns output signal. In a preferred form, a record transport known as PHI-DECK TM, commercially available from Phi Technologies, Inc. of Oklahoma City, Okla., is utilized. Record transport 12 can be used with any of the various commerically available record tape cassettes in any size e.g. C-30, C-60, C-120, etc.

A digital numeric keypad 14 is utilized for entry of message numbers and manual control system functions. Keypad 14 is operational only in the PROGRAM position of a PROGRAM/OPERATE front panel switch. Digital input from keypad 14 is then applied to an encoder 16 which provides binary coded decimal data output via line 18 to random access memory 20. Encoder 16 also provides an entry sequencer output from encoder 16 via line 22 to a counter 24. The counter 24 then generates address data for input to random access memory 20. Binary output on line 18 from encoder 16 is also applied through a command decoder 26 to develop control outputs on line 28 for control of record transport 12. The record transport 12 includes a forward reel turns generator which provides an output via line 30 to an up/down counter 32. In the case of the PHI-DECK TM transport, an optical reel pulse generator provides input to the multi-stage up/down counter 32.

Output from the random access memory 20 in binary coded decimal form is applied through a decoder 34 which provides address data output via line 36 to a programmable read-only memory 38. The read-only memory 38 is preprogrammed to include reel data for location and duration of each message on the tape, and the selected read-only memory data output on line 40 to comparator 42 is compared with actual reel count output from up/down counter 32 on line 44 to output a record transport control signal on line 46. The control signal on line 46 provides fast forward, rewind, etc. control for record transport 12. During play back, message information is applied to the audio output 48 for controlled intermixture with the primary system music or selected audio broadcast.

A front panel interval selector 50 enables the operator to select the time interval in minutes between initiations of successive programmed message deliveries. The selected time indication output is applied as input to a program timer 52 which generates a control output on line 54 to actuate the transport 12 into the PLAY mode.

The system 10 uses the forward reel turns count for determining cassette tape position and this results in an indirect method of addressing specific message locations at high speed without head contact with the tape. For the case of cassettes of up to C-120 size, the relative message position for each of two tracks in relation to the forward drive motor reel counts is as follows:

TABLE I

| RELATIVE POSITION | TRACKS SELECTED BY ADDRESSES | | REEL COUNTS SELECTED | CASSETTES RECOMMENDED |
| --- | --- | --- | --- | --- |
| | TRACK 1 | TRACK 2 | | |
| 1 | 01 | 07 | 0096 | C-30 |
| 2 | 02 | 08 | 0408 | 12 Messages |
| 3 | 03 | 09 | 0702 | |
| 4 | 04 | 10 | 0982 | |
| 5 | 05 | 11 | 1249 | |
| 6 | 06 | 12 | 1504 | |
| 7 | 13 | 19 | 1748 | C-60 |
| 8 | 14 | 20 | 1983 | 24 Messages |
| 9 | 15 | 21 | 2211 | |
| 10 | 16 | 22 | 2432 | |
| 11 | 17 | 23 | 2646 | |
| 12 | 18 | 24 | 2854 | |
| 13 | 25 | 33 | 3056 | C-90 |
| 14 | 26 | 34 | 3253 | 40 Messages |
| 15 | 27 | 35 | 3446 | |
| 16 | 28 | 36 | 3634 | |
| 17 | 29 | 37 | 3818 | |
| 18 | 30 | 38 | 3998 | |
| 19 | 31 | 39 | 4174 | |
| 20 | 32 | 40 | 4347 | |
| 21 | 41 | 51 | 4517 | C-120 |
| 22 | 42 | 52 | 4684 | 60 Messages |
| 23 | 43 | 53 | 4848 | |
| 24 | 44 | 54 | 5009 | |
| 25 | 45 | 55 | 5167 | |
| 26 | 46 | 56 | 5322 | |
| 27 | 47 | 57 | 5475 | |
| 28 | 48 | 58 | 5625 | |
| 29 | 49 | 59 | 5774 | |
| 30 | 50 | 60 | 5922 | |

The starting reel turns count for each of 30 two-minute intervals of a C-120 cassette have been stored in the programmable read-only memory 38. The transport reel pulse output on line 30, e.g. four pulses per revolution, provides input to up/down counter 32 whose output is then compared to the contents of the read-only memory 38 thereby to provide commands controls for the cassette tape to fast forward or rewind, as necessary, in order to zero-in on requested tape position. Two tape tracks are used for the messages, and the ROM 38 also controls the track selection to provide a total of 60 messages from a C-120 tape. In the system, derivation of counts from the forward drive reel enable alternative use of smaller cassettes down to the C-30 type, this being suitable for minimal message applications.

As can be noted in Table I, the turns count for a specific message time will vary substantially with the different relative message positions on the cassette. The basic reel counts illustrated have been developed from a C-120 cassette for precise two-minute running time intervals. Accordingly, C90, C60, and C30 cassettes will have somewhat longer intervals between locations, and for this reason, a unique accuracy adjusting cue-up technique is used in system 10.

The technique consists of using one-half of the allotted tape time interval between messages for a sychronizing tone preceding each message. Thus, during the search process, after the basic reel count is reached, the system enters an automatic silent play mode and runs until the 30 second tone is encountered. The cessation of the tone then causes the tape to stop at a position precisely at the start of the recorded message. Since this process occurs during the time interval between messages, location inaccuracies and start-up delays are eliminated when the PLAY command for the message to play occurs from the message interval timer 52.

FIG. 2 illustrates a portion of a cassette tape 60 from tape start position 62 and includes reference to the two-minute tape time interval between points 64 and 66. The depicted two-minute tape interval is only one in succession of many, e.g. up to thirty. Point 64 designates a message start position, the message number reel count comparison and tape positioning having been previously carried out. The message then plays for about one minute, depending upon programming accuracy, to the tape point 68. The next message reel count determination and tape positioning then commences, and up to about 25 seconds are available for such repositioning. This would be the equivalent of the interval 68 to 70. At point 70, thirty seconds of synchronizing tone is recorded, e.g. a 100 or 200 Hertz tone, and this is followed by a five second silence period 72 just prior to the point 66, the commencement point for the next message when cued from the program timer 52. A silence sense circuit, to be described, verifies the five second silence period to initiate next tape message playback at point 66.

Figure 3B:
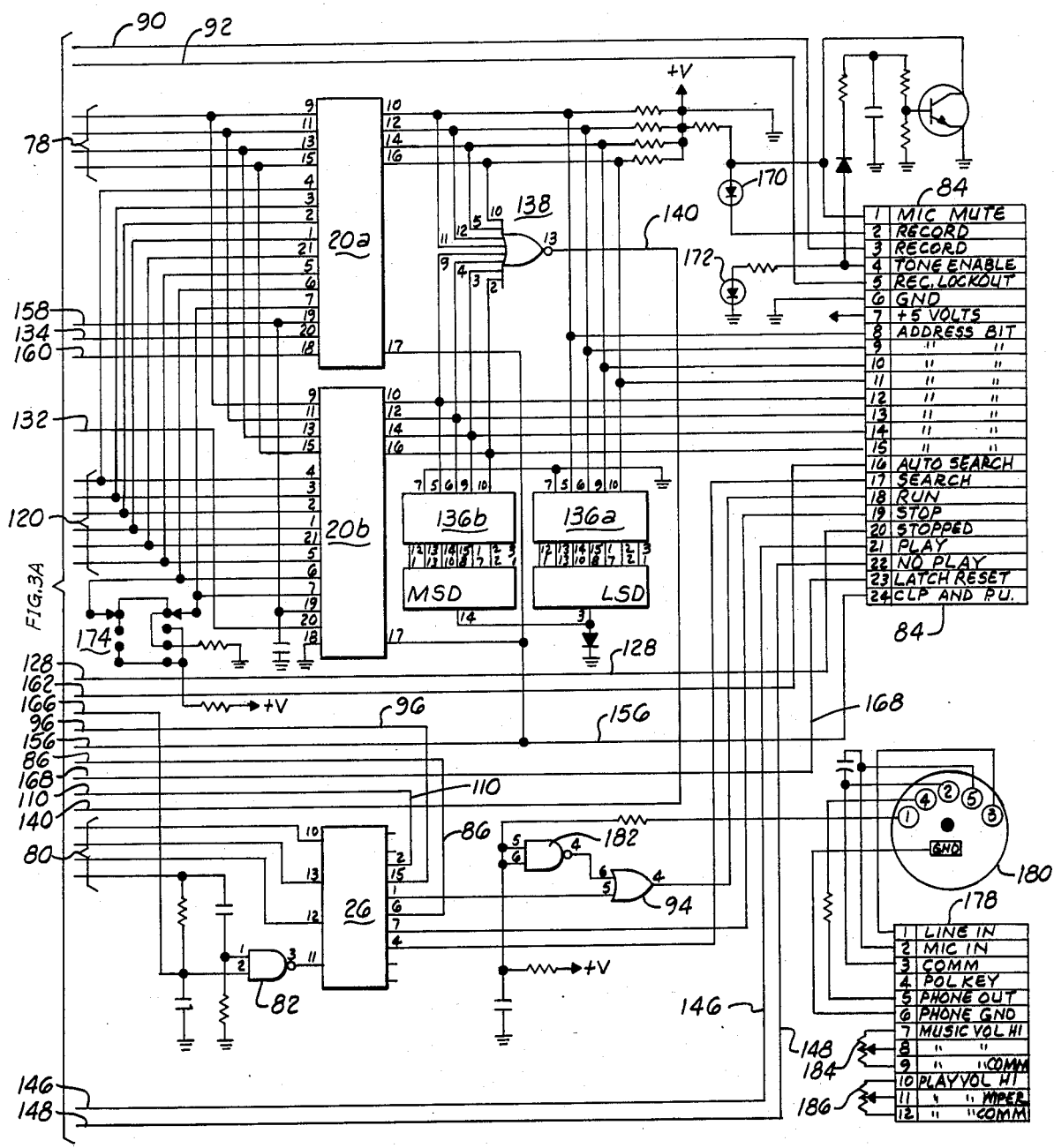

Referring to FIGS. 3A and 3B, the 16-digit keypad 14 is available on the front panel for punch-in of digital programming data via a connector 74 for input to encoder 16 at the 1-7 and 9 pins, A1-A4 and C1-C4, respectively. Encoder 16 is a keypad encoder, IC Type 14419, receiving clock input at pin 15. D1-D4 output on pins 10-13 are then applied through each DUAL gate of quad AND gate 76, IC Type 14081. Respective outputs from AND gates 76 are applied via leads 78 for input to respective ID1-ID4 inputs (pins 9-15) of dual, parallel random access memories 20A and 20B (FIG. 3B).

The pin D1-D4 outputs from encoder 16 are also conducted in parallel for input to respective pins 10, 13, 12 and 11 of command decoder 26, i.e. via parallel leads 80. The command decoder 26 may be such as a BCD-Decimal Decoder, IC Type 14028. The D input to decoder 26 is applied through a NAND gate 82, a Schmitt dual NAND gate, IC 14093 as enabled by the PROGRAM/OPERATE switch 104. Command outputs from decoder 26 are as follows:

Pin 4 controls SEARCH as it is applied to pin 17 of connector 84 to the main board control logic;

Pin 7 output for STOP is applied via pin 19 of connector 84;

Pin 6 output commanding RECORD is applied via lead 86 to pin 1 of a record latch circuit 88, IC Type 14015 Dual 4-bit Shift Register, then output from pin 13 of record latch 88 is applied via lead 90 to pin 3 of main board connector 84, and further output from pin 14 via line 92 is applied to pin 5 of main board connector 84 as record lock-out command;

Pin 1 of command decoder 26 provides RUN command output through OR gate 94 to pin 18 of main board connector 84;

Pin 15 output of decoder 26 provides MEMORY ERASE output via 96 for input to enable each of quad AND gates 76 as well as to the ERASE clock circuit consisting of AND gate 98 and NAND gate 100 with output via lead 102 to the PROGRAM/OPERATE switch 104, the PROGRAM position providing input via lead 106 to enable respective AND gates 108 to pins 20 (R/W inputs) of RAM's 20a and 20b; and Pin 2 output of decoder 26, the MEMORY STEP control, is applied via lead 110 back to the address control logic 112 for input to dual OR gate 113.

Address control output from a Schmitt hex inverter 114 via lead 116 is applied through a NAND gate 118 to the clock input of a 12 bit counter 24, IC Type 14040. The clocked Q1-Q6 outputs, pins 9-2, from counter 24 are then applied via lead group 120 as parallel A0-A5 address inputs to RAM's 20a and 20b.

Output from pin 14 of encoder 16 is applied to the clock input pin 9 of an entry sequencer 122, IC Type 14015. Entry sequencer 122 is further controlled by cycle of output through OR gate and inverter 124 to the D input at pin 7, and reset input at pin 6 is applied from AND gate 126 receiving stopped input on 128 from pin 20 of the main board connector 84 (FIG. 3B). The pin 14 output from encoder 16 is also applied as enable input to NAND gates 130, the RAM power down ensure circuit. Outputs from NAND gates 130 are applied to respective AND gates 108 which, in turn, provide outputs via lines 132 and 134 for input to the respective pin 20 R/W inputs of RAM's 20a and 20b.

RAM's 20a and 20b each provide binary coded decimal output on respective pins 10-16; outputs from RAM 20a being applied to a decoder 136a at pins 5, 6, 9 and 10, as well as to address bit pins 8-11 of main board connector 84, and like outputs from RAM 20b are applied to decoder 136a as well as to pins 12-15 of main board connector 84. The decoders 136a and 136b may be such as IC Type 14495 BCD-7 Segment Decoder. Address bit outputs from RAM's 20a and 20b are also applied through a 00 detector 138, an eight input NOR gate, IC Type 14078. Output from 00 detector NOR gate 138 is then applied on line 140 as input to AND gate 142, an input stage in address control 112.

The time interval selector 50, a front panel control, provides a selected input resistance value to pin no. 1, the RTC input, of program timer 52, IC Type 14541. Resistors varying from 22K to 365K provide program time intervals of 2 minutes, 4 minutes, 6, 10, etc. up to 30 minutes. These, of course, may be readily varied. Q output at pin 8 from program timer 52 is then applied to the play latch circuit 144 as it produces a NAND gate PLAY output on lead 146 and, alternatively, a NAND gate NO PLAY output on lead 148. The PLAY and NO PLAY control signals on leads 146 and 148 are applied to respective pins 21 and 22 of the main board connector 84.

The program operate switch 104 is shown in the PROGRAM position as switch section 104b grounds lead 150 as applied to play latch 144 NAND gate to generate NO PLAY output on lead 148, and switch section 104a connects lead 102 from the gates 98 and 100 of the ERASE clock circuit for enabling input to gates 108 and pins 20 of RAM's 20a and 20b. The lead 150 is further controlled by a sequence reset push button switch 152 as connected to input 12 of NAND gate 154 which provides reset input at pin 11 of counter 24. Pin 12 of NAND gate 154 is also connected to receive input via lead 156 from pin 24 of the main board connecter 84, the CASSETTE IN PLACE and POWER UP control.

As regards further connections between FIGS. 3A and 3B, the pin 10 or Q4 output from sequencer 122 via lead 158 is connected to RAM's 20a and 20b at pin 19, the CEI inputs. The Q1 output at pin 5 of sequencer 122 is applied on lead 160 to the RAM power down ensure NAND gate circuit 130 as well as to pin 18 of RAM 20a, the OD connection. Lead 162 interconnects between the AUTO SEARCH pin 16 of main board connecter 84 and pin 1 input of a NAND gate 164 providing output to an OR gate within the address control stage 112. Lead 166 is connected between the OPERATE position of switch section 104b and the number 2 pin input to NAND gate 82 at pin 11 of command decoder 26, signal is also applied back through an inverter to the clock input pin 15 of encoder 16. Finally, a lead 168 from the LATCH RESET pin 23 of main board connecter 84 is applied as gate input to the play latch circuit 144.

The LED's 170 and 172 indicate RECORD and TONE ENABLE respectively. Program selector switch 174 provides selective address bit control output in respective A6 and A7 inputs of RAMs 20a and 20b. A main board connector 178 from the main board circuitry of FIGS. 4A and B provides connections as listed and primarily to the front panel handset connector 180. Pin 1 provides enabling input to NAND gate 182 for connection through or gate 94 to the RUN pin 19 of main board connecter 84. Further front panel controls originating with the main board through connector 178 are the music volume control 184 and the play back volume control 186. The music volume control 184 controls the music volume independent of message volume while the volume control 186 controls the played back message volume independent of the music volume.

FIGS. 4A and 4B illustrate the main board circuit stages, the main board connector 84 and pin connections being shown in duplicate on FIG. 4A. Thus, address bit pin connections 8-15 of connector 84 are applied to the address bit input of read-only memory 38, IC Type 6381-1 1024×8 Programmable Read-Only Memory. The up/down counter 32, and IC Type 7217A1Four Decade Counter, receives clock input at pin 8 via line 190 from a pulse double circuit 192, U/D input at pin 10 via line 194 from a count direction latch 196, and reset input at pin 14 via lead 198 from count reset inverter 200. The up/down counter 32 provides binary coded decimal output on pins 7-4 to the A0-A3 input of a comparator 42, IC Type 14585 Four Bit Comparator. Data bit output 01-04 from PROM 38 plus 9-14 is also applied to the B0-B3 inputs of comparator 42 as the binary coded decimal data is compared therein. Thus, A equals B output is present on lead 202, A is less than B output is present on lead 204 and A is greater than B output is present on lead 206.

The comparator outputs 202, 204 and 206 are applied to the gate logic circuit 208 which includes NAND flip flops 210 and 212, quad array Type 14044, and finally produces an EQUAL output on lead 214, a FORWARD output on lead 216 and a REWIND output on lead 218. The EQUAL output on lead 214 is applied through gates 220 to the search latch and flip flop 222 which, when set by gate input from search pins 16 and 17 of connector 84, provides output connection from pin 1 through inverter 224 and gate 226 to enable the search direction set up function. That is, output from NOR gate 226 causes set output from NAND gate 228 to a flip flop 230 whereupon Q output is input to respective A lesser and A greater NAND gates of logic circuits 208.

D2-D4 outputs from up/down counter 32 at pins 17-15 are applied to AND gates 232 and 234 whereupon an output is inverted for input to the remaining two address bit inputs of PROM 38, i.e. pins 22 and 23, respectively.

STOP input from pin 19 of connector 84 is applied on lead 236 through NOR gate 238 to each of AND gate 240 and NAND gate 242. AND gate 240 is further enabled by OR gated EQUAL input from lead 214 for input to the R connection of flip flop 222, the search latch flip flop. The NAND gate 242 is actuated by qualified input from the EQUAL circuit to provide output via line 244 to a NOR gate 246 which then provides output to AND gates 250 and 252 to a line 254 that is connected to a series of logic circuits, a RUN latch circuit 256, a FORWARD latch circuit 258 and a REWIND latch circuit 260.

The RUN latch logic 256 produces a RUN output on lead 262 for parallel application about the circuitry. RUN signal on lead 262 is applied through a NOR gate 264 and AND gate 266 to a dynamic braking circuit 268 consisting essentially of a driver inverter and zener diode configuration. Lead 270 from braking circuit 268 is connected to an AND gate 272, effectively a NOT RUN circuit that provides a STOPPED output on lead 274 back to pin 20 of the main board connector 84. RUN latch output on lead 262 is also then applied through an inverter to a lead 276 which is applied variously as an enabling input to FORWARD latch and REWIND latch stages 258 and 260 as well as through successive inverter stages to the head bar control stage 278 and to FIG. 4B where the RUN signal is applied to the silence sense circuit 280.

The RUN signal on lead 262 is still further applied through AND gate 282 and a driver inverter to a FORWARD/REWIND boost circuit 284 consisting of a three-stage amplifier. Output from boost circuit 284 is applied to both pins 9 and 10 of transport connector 286 to effect auxiliary control of REVERSE and FORWARD. Finally, RUN signal on lead 262 is applied to pin 12 of transport connector 286, the capstan motor negative supply, as well as for input to the positive input of a 30-second tone timer 376, one section of Dual OP Amp, IC Type LM358 (FIG. 4B).

Pin 8 of a transport connector 290 carries reel generator output, a two pulse per revolution signal, on lead 292 for input through an integrating anti-dither network 294 and an inverter to the pulse double circuit 192. Output from the pulse double circuit is via lead 190, as applied to pin 8 of up/down counter 32, as well as through AND gate 296 to a take motion sense circuit 298 consisting of an inverter with differentiated output. Tape motion sense output on lead 300 is applied variously throughout the control circuitry. Thus, output on lead 300 is applied through a NAND gate 302 for input to a Schmitt trigger hex inverter 304, IC Type 14584, which, in turn, provides inverted output 198, the reset output to the up/down counter 32. The line 300 output is also applied via an inverter 308 to the input of the boost circuit 284, and it is applied through a NAND gate 310 and NOR gate 312, a search END OF TAPE circuit to provide a signal for input to AND gate 266 and braking circuit 268. Finally, the take motion sense signal on lead 300 is applied through an inverter to AND gates 250, 252 to enable input on lead 254 to the various latch circuits, i.e. RUN, FORWARD and REWIND latch.

Microphone mute signal at pin 1 of main board connector 84 is applied on lead 320 to a microphone mute circuit 322 (FIG. 4B) which mutes input from pin 2 of connector 178 for a predetermined duration. Output from microphone amplifier 324 is then applied through a level amplifier 326, an IC Type LM358 OP Amp, and amplifier output is applied to a normal open contact of relay 328b as well as to a bias potentiometer 330 and the juncture of a dual transistor erase bias oscillator 332. The adjustable voltage output from potentiometer 330 is applied to a normal closed contact 334a of a track selector relay 334, while a second normal closed contact of 334b is controlled in concert by relay 334. Connectors 336 and 338 provide connection of the erase heads and recorder/playback heads, respectively, as channel 1 and channel 2 of each is controlled by actuation of track selector relay 334. In normal position, contacts 328a apply plus voltage to the microphone amplifier 324 while contacts 328b conduct the selected channel 1 or channel 2 input from relay contact 334b for input via line 336 for input to the play pre-amplifier 338, IC Type LM382. Output from amplifier 338 is via lead 340 to pin 10, the play high connection, of main connector 178 (see FIG. 3B). Audio output from amplifier 338 is also applied to the OP Amp input of silence sense circuit 280. Inverted output from silence sense circuit 280 via lead 342 is routed for input to the NOR gate 246 for input to the latching circuits of FIG. 4A.

Main board connector 84 at pins 21 and 22 carry PLAY and NO PLAY signal from pins 21 and 22 via leads 348 and 350, respectively. Thus, PLAY signal on lead 348 is applied as input to an OP Amp 352, IC Type 3401, and input on lead 350 is appled to a similar OP Amp 354. The OP Amp outputs are applied respectively to Opto-couplers 356 and 358 (Clairex Type CLM 6000) with respective outputs being applied to pins 11 and 8 of main board connector 178, the PLAY VOLUME and MUSIC VOLUME pins, respectively. Thus, the OP Amps 352, 354 and Opto-couplers 356, 358 constitute the music fade in-fade out circuit which is called upon before and after delivery of the programmed message. Output from voltage divider junction 360 through Op Amp 362, the line out amplifier, is applied to pin 3 of a rear panel connector 364. The PLAY VOLUME output from Opto-coupler 356 is controlled by a phone volume trimmer potentiometer 364 with output applied through a phone output amplifier 366 applied via line 368 to pin 5 of the main board connector 178.

Pin 2 of main board connector 84 carries record signal on a lead 374 for input to an NPN transistor in the 30-second tone timer stage 288. A tone timer amplifier 376 outputs signal on lead 378 for input to a sync tone generator NAND gate 380 which gates enabling output to the level amplifier 326. Lead 378 is also returned to main board connector 84 at the TONE ENABLE pin position #4. Another record signal from pin 3 of main board connector 84 is conducted on lead 382 for input to control relay 328, the ERASE/PLAY relay. Output from pin 14 of PROM 38, the 05 output, is present on lead 386 of FIG. 4A to the channel control relay 334 thereby to control TRACK SELECT switching.

In operation, the present invention uses standard cassettes of any size for programming nominal one minute messages for reproduction over an annunciator system at selected time intervals and/or sequences. The system of the present invention receives line input of the background music or other primary audio program for broadcast within a store, shopping center or the like, and plays back the audio program with pre-recorded messages while also providing effective background program fade-out and fade-in defining the program message. The multiple message tapes are easily programmed by the operator and such cassettes are readily reproducible using any of numerous duplication methods. Message intervals are selectable over a wide range in accurate times of 2, 4, 6, 10, 15, 20, 30 minutes or more and the system includes separate volume controls for the background program, such as music, as well as for the programmed messages.

The system 10 of the present invention also has an alternative use as a programmed music source. Thus, a cassette can be programmable for up to 90 minutes of music in 30 selections and such selections may be played back under control of the program. The tape transport operates at standard cassette tape speed although the PHI-DECK TM transport is capable of variation, and the system is capable of manual operation mode for regular cassettes. The sound output is high fidelity and various of the optional PHI-DECK TM transport features allow versatile music reproduction while retaining the certain advantages of automatic rewind, sequence restart and other inherent capabilities.

In PROGRAM mode, as set by switch 104, the front panel keypad 14 is provided for entry of message numbers and manual control of system functions. The keypad 14 is operational only in the PROGRAM position of the PROGRAM/OPERATE switch on the front panel. Any music interruption and broadcast functions are also inhibited in the PROGRAM mode in order to provide isolation for recording, programming, monitoring, and other manual operations.

Message numbers are entered with the keypad 14 and stored in the on-board RAM 20. The RAM 20 in turn provides address to the PROM 38 for access to the reel count representing the particular message number. Table I lists the message reel count number for two tracks of all size cassettes. The RAM 20 may be totally erased with the "number" button on keypad 14 and this will always reset the RAM 20 to its starting position. RAM 20 may be reprogrammed at any time, and once programmed, will retain its memory for up to one year even with the power off.

Message numbers are entered sequentially in the RAM 20 with the depression of two keypad 14 number buttons in succession. A front panel display indicates the numbers entered, and the keypad asterisk button will allow stepping through the memory in order to observe the sequence of all numbers entered. Such sequence may be reset by brief removal and reinsertion of the cassette in transport 12. Any entry into the RAM 20 may be erased individually by stepping to message number in question with the asterisk button and thereafter entering 00. In the OPERATE mode, any 00 encountered in the sequence will automatically be skipped over.

Once a cassette has been recorded and the sequence has been programmed, the system 10 may be placed in the automatic operation mode with placement of front panel switch 104 in the OPERATE position. Brief removal and re-insertion of the cassette causes tape rewind and automatic reset of the up/down reel counter 32, the RAM 20 sequence, and message interval timer 52.

The tape will automatically search for the first message of the sequence, play the cue-up tone, stop, and await a message play cue from the message interval timer 52. When the message interval time is reached, the music will fade-out as the message begins broadcast. Note, there is no message fade-in. After five seconds of silence at the end of the message, the tape drive will stop, the music will fade-in, and the sequence will advance and cause an automatic search and cue-up to the next message in the sequence. The message interval timer, interval selector 50 and program timer 52, always resets itself each time a message is started, thereby to maintain an accurate message start-to-start inverval. It should be noted that this interval not only includes the message playing time, but also the search access time as well as the 30-second cue-up tone and five-second silence times which must occur between messages. Thus, if the interval selected is a duration less than the accumulation of the aforementioned times, the interval time will be out of sync for any proper coaction.

In such instances, the circuits will require that the tape must be stopped for a few hundred milliseconds before a message play cue from the interval timer 52 will be accepted. The timer 52 will simply reset itself and restart another interval, resulting in an interval skip-over. This will insure that a search and cue-up process will not be interrupted by the timer and result in an improper or incomplete message broadcast. While a two-minute interval selection has been provided on interval selector 50, it would only be useful for relatively short messages of close proximity on the tape.

The positions on the cassette tape are arranged for a two-minute running time duration; i.e. 30 seconds of blank tape access time, 30 seconds for cue-up and one minute for the message, as shown generally in FIG. 2. If the content of a message is such that more than one minute is required, additional tape positions may be used to accommodate practically any message length desired, within the limits imposed by the Table I format. In this connection, it should be noted that each additional position used will add two minutes to the message length. Thus, message No. 3 (see Table I) could occupy 03 and 04 and allow three minutes; or, it may occupy 03, 04 and 05 to allow five minutes, etc. It is very important to refer to the format shown in Table I to assure that successive message portions are on the same tape track, and are not at the end of a tape.

The foregoing discloses a novel form of annunciator system which may be readily programmed by the user to effect fade-in message introduction over a background broadcast system with very high audio fidelity and programmed insertion at precise intervals. This is accomplished utilizing a standard form of tape deck and commercially available tape cassettes, and the programming control exhibits extreme versatility even for the unskilled programming operator. The system enables numerous advantages both as to electronic reproduction and control and the formatting and duration selection of message lengths and continuity.

Changes may be made in combination and arrangement of elements as heretofore set forth in the specification as shown in the drawings; it being understood that changes may be made in the embodiments disclosed without departing from the spirit and scope of the invention as defined in the following claims.

What is claimed is:

1. Apparatus for programmed audio recording and playback, comprising:
   tape transport means;
   audio output means connected to receive audio signal from said tape transport means to provide audible output;
   a record tape stored on a reel and coactively engaged with said tape transport means;
   reel turn means for generating a reel turns pulse count output indicative of play position on said record tape;
   programmable read only memory for addressably storing reel turns pulse count data for each of a plurality of reel count positions on said record tape;
   random access memory for storing address data for each of said plurality of read only memory reel count positions;
   means enabling a preselected tape reel count position for play by actuating the random access memory to output the selected position address data to said programmable read only memory;
   comparator means comparing the output selected position reel turns pulse count from the programmable read-only memory with the pulse count output from said reel turn means to generate a differential count output; and
   search logic circuit means responsive to the differential count output to actuate said tape transport means selectively forward and rearward until said record tape is positioned at said selected position in readiness for selective playback and recording of audio.

2. Apparatus as set forth in claim 1 which further includes:
   program timer means effective in operate mode to provide a play output at selected time intervals; and
   play logic means actuated by said play output to energize said tape transport means for selected position tape playback.

3. Apparatus as set forth in claim 2 which further includes:
   silence sense circuit means for de-energizing said tape transport means after a preset duration of audio playback absence on said record tape.

4. Apparatus as set forth in claim 1 which further includes:
   means operative in program mode for entering message position identifier data to said random access memory.

5. Apparatus as set forth in claim 4 wherein said means operative in program mode comprises:
   keypad means for entering a successive multi-digit message position identifier and selected transport commands for RUN, RECORD, STOP and SEARCH and outputting characteristic digital output;
   encoder means receiving said digital output and clocking out coded identifier data for input to the random access memory; and
   counter means stroked in synchronism with the encoder means to input address data to said random access memory.

6. Apparatus as set forth in claim 5 which further includes:
   decoder means receiving input of said coded identifier data and outputting digital operating commands; and
   logic circuit means processing said commands to produce control signals to control said tape transport including the RUN, STOP and SEARCH functions.

7. A message annunciator for recording and playback of selected messages at selected times, comprising:
   cassette transport means;
   a tape cassette;
   audio broadcast means receiving audio from said transport means;
   program circuit means for controlling said transport means for programmed recording of said tape cassette to include plural sequential messages each having a code identifier, audio message, and search time and being recorded beginning at a selected position on said cassette as located by forward reel turns count;
   programmed read only memory containing addressable reel turns count data for each selected position;
   random access memory controlled by said program circuit means and containing said code identifiers and address for reel turns count data in said read only memory;
   means generating a forward reel turns count output from said transport means;
   means comparing said read only memory addressed reel turns count data with actual reel turns output to produce a tape position output; and
   search logic means responsive to said tape position output to control said transport means and position said tape for commencement of delivery of the audio message for the selected code identifier.

8. A message communicator as set forth in claim 7 which further includes:
   program time and logic means actuated at specific time intervals to energize said transport means for audible playback of the selected audio message, and search for the reel turns count position for the start of the next programmed audio message.

9. A message annunciator as set forth in claim 8 wherein:
   said tape cassette is programmed selectively on each of two channels to include respective identifiable by reel turns count of the forward reel.

10. Program apparatus for use in controlling a tape transport and record for recording and playback of preselected messages at specific time intervals, comprising:
    input means for recording selected messages on said record at a plurality of designated message positions;
    means generating a reel turns count output for each such message position on said record;
    read only memory means for storing reel turns count data for each message position;
    random access memory means storing message position data and address data for each such reel turns count data stored in said read only memory;
    comparator means receiving input of reel turns count output from said means generating for comparison with selected reel turns count output data from said read only memory to index said tape transport to selected message positions; and means actuating said tape transport to reproduce selected message positions of said record.

11. Program apparatus as set forth in claim 10 which further comprises:
   means operative in program mode for entering message position identifier data to the random access memory means.

12. Program apparatus as set forth in claim 11 wherein said means operative comprises:
   keypad means for entering a successive multi-digit message position identifier and selected transport commands for RUN, RECORD, STOP and SEARCH and outputting characteristic digital output;
   encoder means receiving said digital output and clocking out coded identifier data for input to the random access memory; and
   counter means stroked in synchronism with the encoder means to input address data to said random access memory.

13. Program apparatus as set forth in claim 12 which further includes:
   decoder means receiving input of said coded identifier data and outputting digital operating commands; and
   logic circuit means processing said commands to produce control signals to control said tape transport including the RUN, STOP and SEARCH functions.

14. Program apparatus as set forth in claim 13 wherein:
   the logic circuit means also processes command output from the decoder means to control said tape transport through MEMORY STEP, RECORD, and MEMORY ERASE functions.

15. Program apparatus as set forth in claim 10 which further comprises:
   second logic means effective in operate mode to energize an auto search function for next message position and stop the tape transport record movement; and
   program timer means providing a PLAY output at preselected intervals to actuate tape transport record movement for playback of the message at the selected message position.

16. Program apparatus as set forth in claim 15 which further comprises:
   silence sense circuit means for deactuating said tape transport after a preset duration of audio absence on said record tape.

17. Program apparatus as set forth in claim 15 wherein said second logic means includes:
   gate means energized by said program timer means to generate a play output and alternatively generating a no play output for enabling said auto search function.

18. Program apparatus as set forth in claim 16 which further includes:
   means for inserting the selected messages as played back at selected intervals into a primary audio broadcast network.

19. Program apparatus as set forth in claim 12 which further comprises:
   second logic means effective in operate mode to energize an auto search function for next message position and stop the tape transport record movement; and
   program timer means providing a PLAY output at preselected intervals to actuate tape transport record movement for playback of the message at the selected message position.

20. Program apparatus as set forth in claim 19 which further comprises:
   silence sense circuit means for deactuating said tape transport after a preset duration of audio absence on said record tape.

21. In a programmed annunciator apparatus wherein prerecorded messages are selectively played back, a cassette tape record, comprising:
   a plurality of successive tape intervals of preselected duration each separately locatable in said programmed annunciator apparatus;
   a message portion of said tape interval having a preselected message recorded thereon; and
   a search portion of said tape interval having a first portion with no recording followed by a second portion having a duration of cue-up synchronizing tone of selected frequency recorded thereon, said first portion being of sufficient tape duration to allow for message indexing delays.

22. A cassette record as set forth in claim 21 which further includes:
   a minimal duration of non-recorded tape preceding each message portion to define a tape starting point for next message.

23. A cassette record as set forth in claim 21 wherein:
   said tape intervals are of equal duration as disposed on each of plural tape tracks.

24. A cassette record as set forth in claim 22 wherein:
   said tape intervals are of equal duration as disposed on each of plural tape tracks.

25. A cassette record as set forth in claim 21 wherein:
   said tape interval message portion is essentially the same time duration as said search portion; and
   said cue-up synchronizing tone is approximately one-half the duration of said search portion.

26. A cassette record as set forth in claim 25 which further includes:
   a minimal duration of non-recorded tape preceding each message portion to define a tape starting point for next message.

27. A cassette tape containing a plurality of indexable message recordings, comprising:
   message record portions of selected duration recorded periodically on said tape;
   blank record portions on said tape for a predetermined duration after each message record portion;
   cue-up record portions of synchronizing tone of selected frequency recorded on said tape for a predetermined duration after each blank record portion; and
   a short duration silent period on said tape after each cue-up record portion immediately preceding a next succeeding message record portion.

28. Cassette tape message recordings as set forth in claim 27 wherein:
   plural, successive message, blank, cue-up record portions and silent period are recorded on each of two tape tracks.

29. Cassette tape message recordings as set forth in claim 27 wherein:
   each of said message record portions begins at a preselected forward reel turns count indicative of tape position.

30. Cassette tape message recordings as set forth in claim 28 wherein:

each of said message record portions begins at a preselected forward reel turns count indicative of tape position.

31. Cassette tape message recordings as set forth in claim 27 wherein:

said message record portions are approximately one-half the duration of the total indexable message recording.

* * * * *